(12) United States Patent
Sawitzki et al.

(10) Patent No.: US 7,774,573 B2
(45) Date of Patent: Aug. 10, 2010

(54) SINGLE MEMORY WITH MULTIPLE SHIFT REGISTER FUNCTIONALITY

(75) Inventors: Sergei Sawitzki, Eindhoven (NL); Cornelis Hermanus Van Berkel, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 304 days.

(21) Appl. No.: 10/562,887

(22) PCT Filed: Jun. 30, 2004

(86) PCT No.: PCT/IB2004/051061
§ 371 (c)(1),
(2), (4) Date: Dec. 29, 2005

(87) PCT Pub. No.: WO2005/003956
PCT Pub. Date: Jan. 13, 2005

(65) Prior Publication Data
US 2006/0155927 A1   Jul. 13, 2006

(30) Foreign Application Priority Data
Jul. 2, 2003   (EP) .................................. 03101980

(51) Int. Cl.
*G06F 12/00*   (2006.01)
(52) U.S. Cl. ....................... 711/202; 711/205; 711/211; 711/212
(58) Field of Classification Search .................. 711/202, 711/205, 211, 212, 219
See application file for complete search history.

(56) References Cited
U.S. PATENT DOCUMENTS

| | | | |
|---|---|---|---|
| 4,750,154 A | 6/1988 | Lefsky et al. | |
| 4,879,720 A | 11/1989 | Shumate et al. | |
| 5,627,797 A * | 5/1997 | Hawkins et al. | ............. 365/221 |
| 5,682,356 A * | 10/1997 | Knaack | ................. 365/189.15 |
| 5,712,992 A * | 1/1998 | Hawkins et al. | ............... 710/57 |

(Continued)

FOREIGN PATENT DOCUMENTS

EP   0 498 065 A2   10/1991

(Continued)

OTHER PUBLICATIONS

International Search Report issued by the European Patent Office on Oct. 4, 2004 in PCT Application No. PCT/IB2004/051061.

(Continued)

*Primary Examiner*—Reba I Elmore

(57) ABSTRACT

The present invention relates to a memory device comprising a memory (EM) having at least two predetermined register memory sections addressable by respective address ranges AS1-ASz) and at least one access port (P1-PZ) for providing access to said memory (EM). Furthermore, access control means (A) are provided for addressing said memory (EM) so as to operate said register memory sections as shift registers and to map shift register accesses of the at least one access port (P1 to PZ) to predetermined addresses in the global address space of the memory (EM). In this way, it is possible to combine a plurality of FIFO memories in a single addressable memory device. This implementation is favourable in view of power consumption and area. Furthermore, by introducing a buffer memory, a multi-port memory device can be replaced by a single-port memory device of the same capacity. This advanced implementation also provides a reduced cycle and access time.

20 Claims, 3 Drawing Sheets

U.S. PATENT DOCUMENTS

| | | | |
|---|---|---|---|
| 5,764,967 A * | 6/1998 | Knaack | 713/500 |
| 5,809,339 A * | 9/1998 | Hawkins et al. | 710/57 |
| 5,812,820 A * | 9/1998 | Loram | 703/20 |
| 5,828,992 A * | 10/1998 | Kusmierczyk | 704/8 |
| 5,850,568 A * | 12/1998 | Hawkins et al. | 710/57 |
| 5,852,748 A * | 12/1998 | Hawkins et al. | 710/54 |
| 5,963,499 A * | 10/1999 | Leong et al. | 365/230.03 |
| 5,978,868 A * | 11/1999 | Maas | 710/52 |
| 5,991,834 A * | 11/1999 | Hawkins et al. | 710/57 |
| 6,526,495 B1 * | 2/2003 | Sevalia et al. | 711/173 |

FOREIGN PATENT DOCUMENTS

| | | |
|---|---|---|
| GB | 2 214 759 A | 6/1989 |

OTHER PUBLICATIONS

PCT/IB2004/051061 International Preliminary Report on Patentability, International filing date Jun. 30, 2004, date of issuance Jan. 3, 2006.

* cited by examiner

| Cycle | Action |
|---|---|
| 0 | No access (write 4 samples into align buffer) |
| 1 | No access (write 4 samples into align buffer) |
| 2 | Write access (write 4 samples into align buffer and copy the align buffer into memory) |
| 3 | Read access (transfer 12 samples to the first PRML decoder + write 4 samples into align buffer) |
| 4 | Read access (transfer 12 samples to the second PRML decoder + write 4 samples into align buffer) |
| 5 | Write access (write 4 samples into align buffer and copy the align buffer into memory) |
| 6 | Read access (transfer 12 samples to the third PRML decoder + write 4 samples into align buffer) |
| 7 | Read access (transfer 12 samples to the fourth PRML decoder + write 4 samples into align buffer) |
| 8 | Write access (write 4 samples into align buffer and copy the align buffer into memory) |
| 9 | Read access (transfer 12 samples to the fifth PRML decoder + write 4 samples into align buffer) |
| 10 | No access (write 4 samples into align buffer) |
| 11 | Write access (write 4 samples into align buffer and copy the align buffer into memory) |

Fig. 5

| C | W | R | O1 | O2 | O3 |
|---|---|---|---|---|---|
| 0 | L0 | | | | |
| 1 | | L0 | L0 | | |
| 2 | L1 | | | | |
| 3 | | (L4) | | (L4) | |
| 4 | L2 | | | | |
| 5 | | (L7) | | | (L7) |
| 6 | L3 | | | | |
| 7 | | L1 | L1 | | |
| 8 | L4 | | | | |
| 9 | | (L5) | | (L5) | |
| 10 | L5 | | | | |
| 11 | | (L8) | | | (L8) |
| 12 | L6 | | | | |
| 13 | | L2 | L2 | | |
| 14 | L7 | | | | |
| 15 | | L3 | | L3 | |
| 16 | L8 | | | | |
| 17 | | L6 | | | L6 |

Fig. 6

SINGLE MEMORY WITH MULTIPLE SHIFT REGISTER FUNCTIONALITY

The present invention relates to a memory device having a shift register functionality, such as a FIFO (First-In-First-Out) memory, which can be used for coupling one or more data sources to a plurality of data processing devices.

Densities and transfer rates in modern storage systems are steadily increasing. One of the consequences of this are increased amplitude and phase distortions hampering the read-out signal. To sustain an acceptable error rate under these circumstances, advanced signal processing techniques are required. Partial-Response Maximum-Likelihood (PRML) receivers proved to be extremely efficient for a very wide scale of applications ranging from (magneto-) optical disc systems and hard drives to satellite and mobile communication systems. PRML-based detection is used in almost all high-end storage systems nowadays. The use of PRML-based receivers allows to significantly increase the system capacity and/or margins or, equivalently, decrease costs while keeping the capacity and/or margins unchanged. In particular, introducing the PRML-based detection in advanced optical disc systems, such as DVD+RW (Read and Writeable Digital Versatile Disc) and DVR (Blue-ray Disc), is shown to decrease system sensitivity to noise, defocus and disc tilt. The PRML-based detection allows to relax the requirements on the mechanical and optical system components and, as a result, to achieve higher system robustness and lower production costs.

The so-called Viterbi algorithm is considered to be the most efficient practical implementation of the PRML detector. However, the speed of the Viterbi algorithm is intrinsically limited because of the data-dependent feedback loop it contains. An Add-Compare-Select (ACS) operation has to be executed every clock cycle, and the next cycle cannot be started before the result of the ACS operation is available.

Apart from increasing the raw clock frequency, an alternative approach has been suggested to improve the throughput of a Viterbi detector. This alternative approach is based on the idea of splitting an incoming data stream into several sub-streams and processing them in parallel. However, a parallel implementation of the Viterbi decoder for data read at high speed from a digital storage or transmission system, such as an optical disc, a hard disc or tape in particular, requires the use of expensive and power-consuming high clock rate digital hardware. Such high clock rate digital hardware results for example from the requirement of having the different parallel data streams buffered in FIFO memory blocks. Attempts to combine the different FIFOs in one embedded block lead to a demand for a multi-port memory, if the sum of the sample rates of the FIFOs is higher than the system clock. This is the case in many signal or image processing systems, storage systems as well as communication systems.

In terms of area and power consumption as well as silicon implementation aspects, one unified memory block of capacity Z×B is usually cheaper than Z memory blocks of capacity B, so that it would be preferable to use one memory of a bigger capacity than many small ones. Additionally, single-port memories of the same capacity are cheaper than their multi-port counterparts. Consequently, it is preferable to use single-port memories instead of multi-port ones.

It is therefore an object of the present invention to provide a memory architecture which enables replacement of several small FIFO memory blocks by one unified embedded memory block.

This object is achieved by a memory device as claimed in claim 1.

Accordingly, the proposed architecture in which shift register accesses to predetermine register memory blocks are mapped to subsequent addresses in the global address space of the memory, allows to combine a plurality of FIFOs or other kinds of shift register memories in one embedded memory, such as a RAM (Random Access Memory). This implementation is most favourable in view of power consumption and area. Furthermore, the favourable implementation allows to replace a multi-port RAM by a single-port RAM of the same capacity. Such an implementation is not only even more favourable in terms of area and power, but also has a reduced cycle and access time.

The access control means may comprise at least one address counter or any kind of finite state machine which generates the required address sequence. Thereby, a simple implementation for address generation can be provided.

Furthermore, the address ranges of the predetermined register memory sections may comprise overlapping regions of a predetermined size. This provides the advantage that the capacity of the embedded memory is less than the total number of memory locations of all replaced FIFO blocks. These overlapping regions can be advantageously used as training regions for Viterbi detectors, where an incoming data stream is splitted between several detectors in such a way that the sub-streams overlap. In this case, one detector has the overlapping region at the end of its sub-stream and another detector has the same region at the beginning of its sub-stream. The latter detector may use the overlap region for training purposes since the bit decisions can be supplied by the former one. The proposed scheme needs no special markers in the data stream, and can be used in applications where the data stream is already standardised and there is no possibility to include markers in it.

The at least one access port may provide access to a plurality of data sources for writing data to respective ones of the register memory blocks, and to a plurality of data processing devices for reading data from the register memory blocks. In particular, the access control means may be arranged to provide alternate access for the data sources and the data processing devices. The data source accesses may be controlled to cycle through the global address space, and the processing device accesses may be controlled to cycle through the address range of the respective register memory section. This cyclic read and write operations facilitate address translation required for the read-out accesses.

As an advantageous modification, a buffer memory may be connectable to the at least one access port and to the memory, wherein a line width of the buffer memory and the memory is selected to be greater or equal the data width of the at least one access port multiplied by the sum of read accesses and write accesses per cycle. Thereby, a single-port architecture can be provided, where the embedded memory is replaced by a memory block of less memory lines and correspondingly more bits per line. The data source or data sources provide(s) the write data to the embedded memory via the buffer memory. In this way, an entire line can be written to the embedded memory at each write cycle to thereby reduce the access frequency. Multi-port RAM devices can thus be replaced by single-port RAM devices of the same capacity, while providing a reduced cycle and access time. Moreover, the number of write ports of the at least one access port may now differ from the number of read ports. Hence, the number of data symbols accepted by the memory device may differ from the number of data symbols produced in every cycle. This provides the advantage that the number of processing devices connected to the embedded FIFO memories may vary and does not have to be equal to the number of input data streams.

The access control means may comprise address translation means for aligning addresses relating to the read accesses in such a way that they fit to the line width. In particular, the access control means may be adapted to transfer write accesses to the buffer memory until it is full, and to write one memory line when the buffer memory is full. On the other hand, the access control means may be adapted to align read accesses in such a way that a block of the line width is read all the time. The address translation means may comprise a look-up table or a finite state machine which generates the required output sequence Advantageous modifications of the present invention are defined in the dependent claims.

The present invention will now be described on the basis of preferred embodiments with reference to the accompanying drawings, in which:

FIG. 5 shows a table indicating a memory access schedule according a first implementation example; and FIG. 6 shows a memory access schedule according a second implementation example.

The preferred embodiments will now be described on the basis of a memory architecture where a number Z of FIFO memory blocks are implemented in one unified embedded memory block EM.

Figure 1:
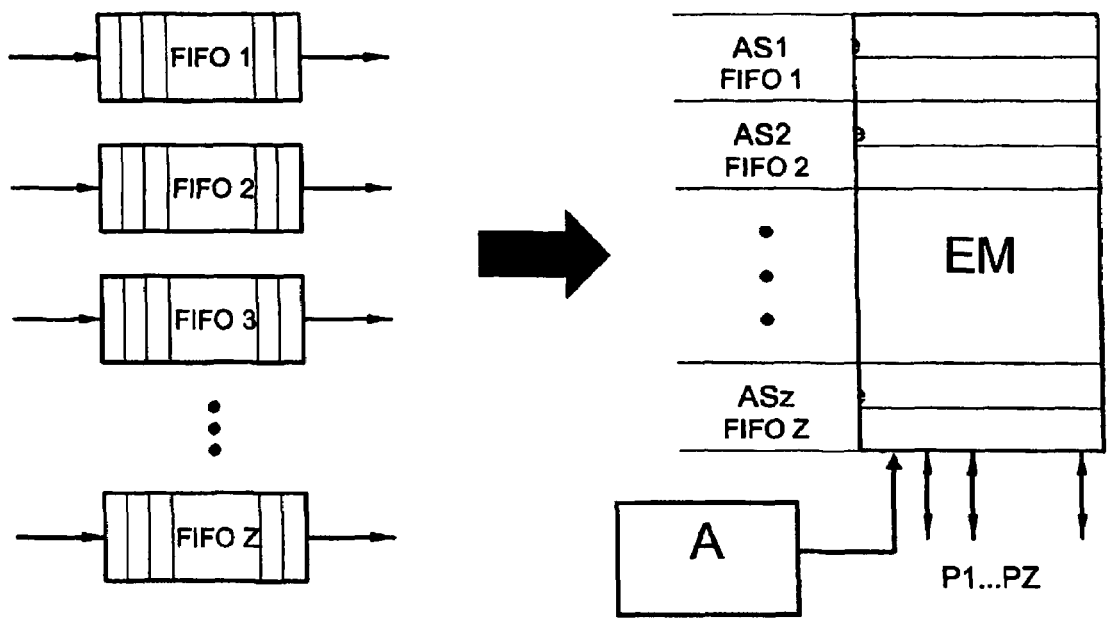
FIG. 1 shows schematic functional block diagrams indicating a transfer from individual FIFO memory devices to a memory device according to the first preferred embodiment with embedded FIFO blocks.

FIG. 1 shows a schematic functional block diagram indicating in its left portion conventional discrete FIFO memory blocks FIFO1 to FIFOZ with dedicated input terminals and output terminals. This conventional structure can be transferred to a memory architecture according to the first preferred embodiment of the present invention shown in the right portion of FIG. 1. According to the first preferred embodiment, the small FIFO blocks FIFO1 to FIFOZ are replaced by one unified embedded memory block EM. Thus, if the Z FIFO blocks each have a memory capacity B, they can be combined into the embedded memory block EM having a capacity of Z×B, wherein the FIFO accesses can be mapped to subsequent addresses in the global address space of the embedded memory block EM. It is to be noted here that the capacities of the FIFO blocks not necessarily have to be the same. Each FIFO block may have an individual specific capacity, which has to be considered in the implementation of the individual addressing schemes. The read and/or write accesses can be controlled by an access control unit A which supplies corresponding control signals and addresses to the embedded memory block EM. Furthermore, data units to be written to or read from the embedded memory block EM can be supplied via respective access ports P1 to PZ.

Each FIFO block has assigned or allocated a predetermined FIFO memory section with corresponding address ranges AS1 to ASz. The address generation functionality of the access control unit A may be based on sequential or cyclic counters or sequential or cyclic counting functions to thereby generate subsequent addresses for reading from and writing to the embedded memory block in a FIFO manner, i.e. the first data unit which is written to the corresponding FIFO memory section after a corresponding shift delay which corresponds to the width of the FIFO memory section. In particular, a key feature of the FIFO or other shift register memories is that data units or data words are read and written sequentially.

The system designer may thus replace the conventional small FIFO blocks FIFO1 to FIFOZ by the unified embedded memory block EM, for example, when designing multiplexing or demultiplexing devices which may be used in Viterbi detectors and which may comprise an interleaver or de-interleaver functionality, respectively. In these cases, an incoming data stream is de-multiplexed and interleaved to allow parallel processing of the data by a set of "out-of-the-shelf" Viterbi detectors. The output data streams coming from the parallel Viterbi detectors are multiplexed and de-interleaved to form the output bit decision stream with a format similar to the format of the input stream. A Viterbi-based bit detector organised in such a way is transparent to the rest of the system and can be easily integrated into the existing data flow within an integrated circuit. Each of the sequential Viterbi decoders may be operated at a speed lower than the bit rate. The slower the speed of the Viterbi detectors is, the more Viterbi detectors are needed to run in parallel. The number of Viterbi detectors grows at least almost linearly with the ratio between the bit rate and the speed of the detectors.

For such detector applications or even for other kinds of applications, it can be useful to create overlapping regions between the different FIFO memory sections of the embedded memory block EM. Then, at least one additional Viterbi detector is needed in order to handle the overhead related to the presence of the overlapped regions in the subdivision of the input stream, wherein the same input samples are processed at least twice in the regions of overlap. The size of the overlap region, which is required to keep the error rate of the proposed parallel Viterbi detector unchanged with respect to the standard sequential Viterbi detector, is small. It could be in the order of 50 to 100 input samples for the concerned application, e.g., optical disc systems, hard disc drives, digital tape storage systems, or the like. A part of the overlap region, typically 30 to 50 samples, can be used to initialise a backtracking array while the remaining part of it, typically 20 to 50 samples, can be used to initialise a path metrics. The provision of such overlapping regions leads to the advantage that the capacity of the embedded memory block EM is less than Z×B.

Figure 2:
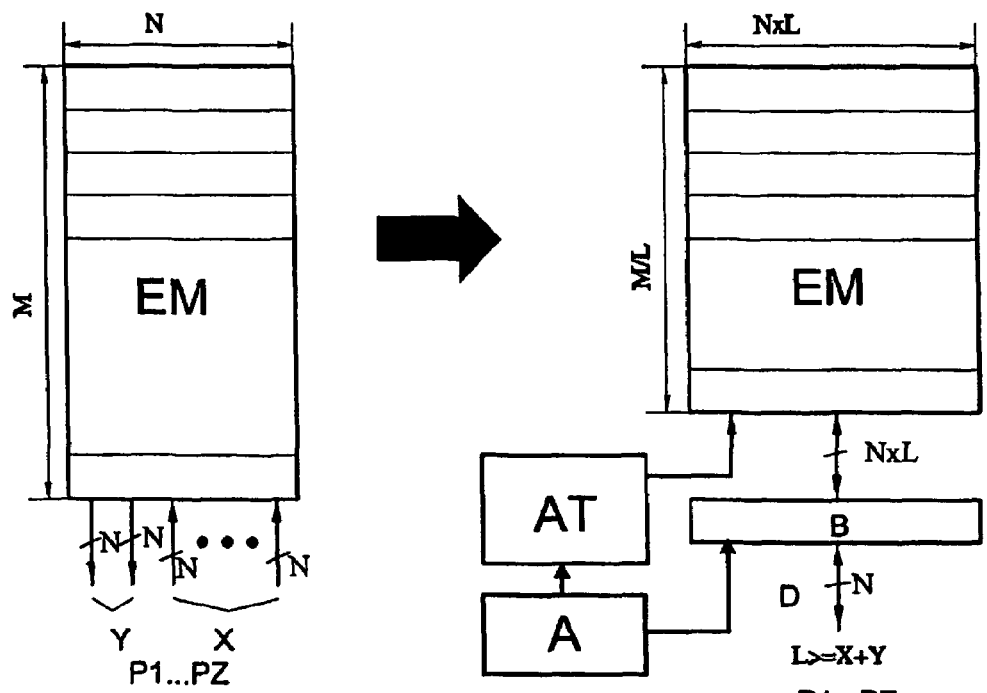
FIG. 2 shows functional block diagrams indicating a transfer from an embedded multi-port memory structure to a single-port memory device according to the second preferred embodiment with buffered access.

FIG. 2 shows a schematic functional block diagram of a second preferred embodiment in which the multi-port embedded memory block EM is replaced by a single-port embedded memory block EM with an additional buffer memory B.

In this connection, it is assumed that a multi-port memory block EM of M lines with N bits per line, as shown in the left portion of FIG. 2 has to handle X write accesses and Y read accesses in every cycle. Therefore, the access ports P1 to PZ comprise X write ports and Y read ports. This implies that two or more write ports may be assigned to one FIFO memory section or that one read port may be assigned to more than one FIFO memory section.

If the line width L of the buffer memory B satisfies the condition $L \geq X+Y$, then the embedded memory block EM can be replaced by the single-port memory block which then comprises M/L lines with L×N bits per line, if read and write accesses are buffered. With the enhanced buffer size of L×N bits on the write side, the accesses can be transferred to the buffer memory B instead of the embedded memory block EM until the buffer memory B has been filled. Once the buffer memory B is full, one memory line of the embedded memory block EM can be written.

In case, the timing requirements of the buffer memory B do not allow writing data into the buffer memory B and copying the buffer content to the embedded memory block EM within the same cycle, the width of the buffer memory B can be defined as one sample width smaller than the width of the embedded memory block EM, i.e. a buffer width of N×(L−1), so that the last access (which would otherwise have filled the buffer memory B) is directly transferred to the embedded memory block EM in parallel with the buffer contents without being buffered. However, the line width between the buffer memory B and the embedded memory block EM remains L×N.

At the read side, the accesses have to be aligned in such a way that a block of L×N bit is read all the time. In view of this, the access control unit A is adapted to generate addresses in such a manner that the addresses of the accesses are aligned to fit the line size of the embedded memory block EM. This can be achieved by introducing an address translation unit AT which may be a separate unit or which may be incorporated into the address generation functionality of the access control device A. The address translation unit AT may be provided or controlled on both read and write sides.

This buffering scheme introduces a latency of L cycles added to the access time, i.e. data written in a cycle K becomes available only in the cycle K+L+1. For most applications, however, the parameter L is rather small. In addition, many applications which operate on a stream of data samples are not very sensitive to latency anyway.

Hence, in the second preferred embodiment, the input data stream or streams which result from one ore more data sources provides write data to the embedded memory block EM via the buffer memory B having a length corresponding to the enhanced line width of the embedded memory block EM. In this way, an entire line which corresponds to several memory accesses, can be written to the embedded memory block EM at each write cycle. Thereby, the access frequency can be reduced as compared to the multi-port embedded memory block of the first preferred embodiment.

Figure 3:
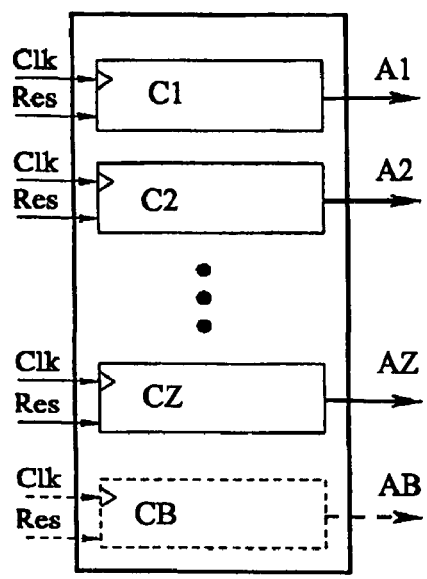
FIG. 3 shows a schematic block diagram of an address generation functionality used in the first and second preferred embodiments.

FIG. 3 shows a schematic block diagram of the address generation functionality in the access control unit A in the first and second preferred embodiments. The address generation may be based on simple counters or counter functions C1 to CZ for generating respective addresses Al to AZ to be used for addressing the FIFO memory sections allocated to the access ports P1 to PZ. Each counter function is controlled by a clock signal Clk and by a reset signal Res for resetting the counter function to a predetermined initial address value. In case of an addressing of FIFO memories, as in the first and second preferred embodiments, the counter functions C1 to CZ may simply be implemented as sequential counter functions, e.g., a first counter for generating a pointer to the respective one of the address ranges AS1 to Asz and a second counter for generating the respective address of the memory line within the selected actual FIFO address range.

In the second preferred embodiment, an additional counter or counter function CB is provided for generating a buffer address AB to be used for addressing the buffer memory B.

It is noted that any finite state machine (FSM) which is adapted to generate the required address sequence can be used instead of the counter functions C1 to CZ, CB shown in FIG. 3.

Figure 4:
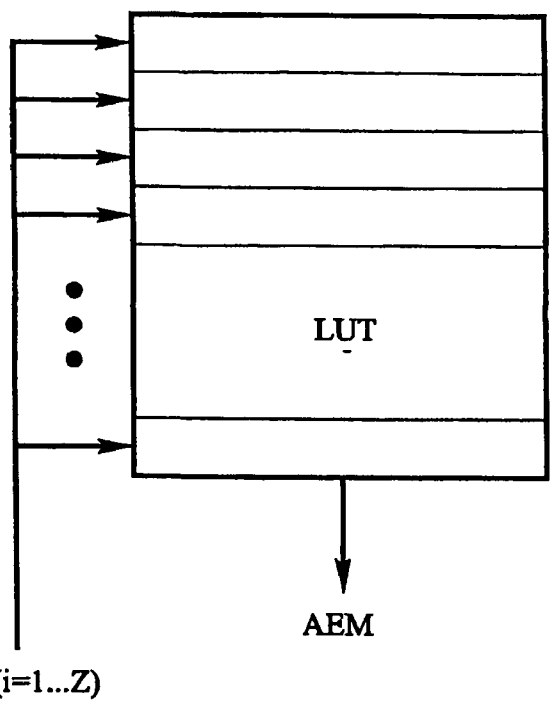
FIG. 4 shows a schematic block diagram of an address translation functionality used in the second preferred embodiment.

FIG. 4 shows a schematic block diagram of the address translation functionality in the access control unit A according to the second preferred embodiment. This address translation functionality may simply be implemented based on a look-up table LUT in which the required address sequences are stored. The look-up table LUT is addressed by the addresses A1 to AZ generated by the address generation functionality of the access control unit A. For each of the addresses A1 to AZ a corresponding memory address AEM of the embedded memory block EM is stored in the look-up table and supplied to the embedded memory block EM.

However, also the address translation functionality may as well be implemented as an FSM which produces the required address sequence. In the case of FIFO memory sections, this FSM may again consist of two simple cyclic counters.

It is noted that the above first and second embodiments can be implemented in a fully independent manner and do not require any increase in the clock frequency.

In the following, a first example of an implementation of the preferred embodiments is described with reference to FIGS. 5 and 6. The implementation may be used in a multiplexing or demultiplexing functionality of a parallel PRML bit detector such as a Viterbi detector. In this system, five data streams are processed in parallel, so that five FIFO memory sections are required in the embedded memory block EM. At the input side, for samples of eight bits each must be read and distributed between the FIFO memory sections every clock cycle. In the case of the first preferred embodiment, a multi-port memory architecture is obtained with at least one access port, i.e. one read port and one write port. The access port has to be able to accept four samples and to produce five samples in every cycle.

The required memory capacity depends on the specific application. It is assumed that each FIFO memory section has a memory capacity of 300 bytes. In the case of non-overlapping FIFO memory sections, a total capacity of the embedded memory block EM would be 1500 bytes. In case of a 20% overlap of the data read, which means that some of the input samples are read by two different FIFOs, the address ranges AS1 to ASz in FIG. 1 overlap, such that a total capacity of 1200 bytes is enough.

In the case of the second preferred embodiment, the line width of the buffer memory B may be 12 bytes, such that 12 memory accesses can be buffered. The embedded memory block EM can be organised as a SRAM (Static RAM) with hundred lines of 96 bits each, assuming that one byte consists of 8 bit. Thus, three cycles are required to buffer the 12 samples and write them to the embedded memory block EM. Consequently, a write access occurs once in three cycles. With one read access, 12 samples are read, wherein five read accesses occur due to the required processing of five data streams at the output side of the embedded FIFO blocks. Thus, the five read accesses occur during every 12 cycles. Due to the fact that the lengthening factor has a value of L=12 in the present case and the number of write accesses has a value of X=4 and the number of read accesses has a value of Y=5, the above requirement L≧X+Y is satisfied in the present first example.

FIG. 5 shows a table indicating one possible implementation of a suitable memory access schedule for the first example. In the first and second cycles (cyles No. 0 and 1) no access is performed to the embedded memory block EM, and in each cycle four samples are written into the buffer memory B. In the third cycle (cycle No. 2) four samples are again written into the buffer memory B which is now full so that a write access to the embedded memory block EM can be performed by copying the content of the buffer memory B into the embedded memory block EM. In the fourth cycle (cycle No. 3) a read access can be performed to the first processing unit at the output side of the embedded FIFO blocks, e.g. a first PRML decoder, so as to transfer 12 samples to the first PRML decoder, while four samples are again written into the buffer memory B. Similarly, in the fifth cycle (cycle No. 4), a second read access is performed and 12 samples are transferred to a second PRML decoder, while four samples are written into the buffer memory B. In the sixth cycle (cycle No. 5), four samples are written into the buffer memory B which is now again full, so that its content is copied into the embedded memory block EM in a new write access. Then, in the seventh and eight cycles (cycle No. 6 and cycle No. 7), respective read accesses are performed in order to transfer 12 samples to a third PRML decoder and to a fourth PRML decoder, while four new samples are written into the buffer memory B in each of the two cycles. Then, in the ninth cycle (cycle No. 8), four samples are written into the buffer memory B which is now full again, and its content is copied into the embedded memory block EM during another write access. In the tenth cycle (cycle No. 9), a read access is performed again, wherein 12 samples are transferred to a final fifth PRML decoder, while four new samples are written into the buffer memory B. In the following eleventh cycle (cycle No. 10), no access to the embedded memory block EM is performed at all, while four samples are written into the buffer memory B. Finally, in the twelfth cycle (cycle No. 11), four additional samples are written into the buffer memory B which is then full again, and a third write access is performed to copie the content of the buffer memory B into the embedded memory block EM.

Accordingly, every twelve cycles there are four write accesses and five read accesses. However, this does not mean that the memory lines of the read accesses are located more and more ahead of the memory lines of the write accesses. The reason for this is that, from time to time, the same data are written by two different ones of the PRML decoders.

In general, the line width of the buffer memory B and the embedded memory block EM not necessarily correspond to the sum of the number of write accesses and read accesses. Actually, the parameter L has to be at least this sum. However, a higher value can be chosen for the parameter L e.g. if this value better matches to a suitable memory size of the embedded memory block EM, for example 1200 bytes.

In fact, in the above first example, written data becomes available only after 13 cycles. It has to be noted that in cycle No. 3 of FIG. 5, the read data does not correspond to the data written one cycle earlier. There is always a delay of at least 13 cycles. In addition, after power-on, some time is needed to write data into the embedded memory block EM before "useful" data can be read.

In a practical implementation, the resulting embedded memory block EM of the second preferred embodiment, excluding any buffers and address generators, has an area of 0.15 mm$^2$ and consumes 0.951 mW/Mhz in CMOS18 process. A comparable dual-port memory which suits the requirements of the application, i.e. 240 lines with 40 bits/line, requires an area of 0.46 mm$^2$ and consumes 0.211 mW/Mhz per access port. In addition, the usage of the single-port embedded memory block EM allows an IC implementation with less advanced and thus cheaper CMOS process. An implementation of five FIFOs would result in an area of 0.44 mm$^2$ and a power consumption of 0.944 mW/Mhz. The advantages of the proposed technique are thus clearly visible.

FIG. 6 shows another suitable memory access schedule for a second example of the preferred embodiments. In this second example, three output processing devices O1 to O3 are connected to the embedded memory block EM which in the present second example comprises a total memory capacity of nine lines L0 to L8. Consequently, each FIFO section consists of three lines. In particular, the first output processing device O1 uses lines L0 to L2, the second output processing device O2 uses lines L3 to L5, and the third output processing device O3 uses lines L6 to L8. Every even cycle, a write access takes place, and every odd cycle, a read access. The write address generation functionality of the address translator AT generates an address A=C/2 mod 9, wherein C denotes the cycle number and "mod" denotes the mathematical modulo operation. Furthermore, the read address generator functionality of the address translator AT generates a read address A=3×(n mod 3)+INT (n/3 mod 9), wherein n=(C−1)/2.

Hence, the write address cycles through the memory in another order than the read address. Thus, the output samples are not necessarily in the same order as the input samples. According to FIG. 6, a reading scheme "read L0"→"read L1"→"read L2" is used for the first output processing device O1. Furthermore, a reading scheme "read L4"→"read L5"→"read L3" is used for the second output processing device O2, while the initially read lines L4 and L5 are discarded after initialisation. For the third output processing device O3, the reading scheme is "read L7"→"read L8"→"read L6", while the initially read lines L7 and L8 are discarded. The discarding functionality may be implemented by inserting some dummy data which does not represent any meaningful data in the beginning of the stream. This discarding functionality is only relevant at the start after reset, when the embedded memory block EM is empty. The initially discarded lines are indicated in FIG. 6 by corresponding brackets. Thus, in the access scheme of FIG. 6, the second and third output processing devices O2 and O3 receive their first "useful" data after a short delay, whereas the first output processing device O1 receives it immediately.

As soon as every address was written at least once, the system has passed the initialisation and has reached a stable state, so that no discarding is required anymore. Also in the Viterbi detector example, this problem can be solved by introducing some "senseless" or dummy data in the beginning for initialisation purposes as already mentioned above.

As can be gathered from FIG. 6, lines L0 to L8 are successively written in every even cycle starting with the first cycle (cycle No. 0). In the second cycle (cycle No. 1), line L0 is read and supplied to the first output processing device O1. In the fourth cycle (cycle No. 3), line L4 is read and supplied to the second output processing device O2, while the content is discarded during the initial first reading operation. In the sixth cycle (cycle No. 5), line L7 is read and supplied to the third output processing device O3, while the content is again discarded during the initial first reading operation for this third output processing device O3. In the eighth cycle (cycle No. 7), line L1 is read and supplied to the first output processing device O1. Furthermore, in the tenth cycle (cycle No. 9) line L5 is read and supplied to the second output processing device O2. Also this content is discarded during the first reading operation. The same applies to the reading of line L8 in the twelfth cycle (cycle No. 1), which is supplied to the third output processing device O3. Then, during the fourteenth cycle (cycle No. 13), line L2 is read and its content is supplied to the first output processing device O1. In the sixteenth and eighteenth cycles (cycles No. 15 and 17), respective lines L3 and L6 are read and supplied to the respective second and third output processing devices O2 and O3. Then, the procedure starts again with the first cycle (cycle No. 0).

It is noted, that the present invention is not restricted to the above access schemes shown in FIGS. 5 and 6. Any suitable addressing scheme can be used in dependence on a desired access scheme. Moreover, any number of read accesses, write accesses and line numbers can be implemented, while the above width requirement of the buffer memory B has to be considered in the second preferred embodiment.

The present invention can be applied to any parallel shift register structure in optical disc systems, such as Portable Blue (PB) or Small Form Factor Optical (SFFO), DVD, DVD+RW, DVR, or any future optical disc system. Moreover, the present invention can be applied to magneto-optical systems, hard disc systems, digital tape storage systems, satellite and mobile communication systems, image processing systems and the like. In case of PRML or Viterbi processing systems, the present invention can be applied in the demultiplexing or interleaving functionality at the input side or as well in the multiplexing or de-interleaving functionality at the output side. The preferred embodiments may thus vary within the scope of the attached claims.

The invention claimed is:

1. A memory device comprising:
   a. a memory having at least two predetermined register memory sections addressable by respective address ranges;
   b. at least one access port for providing access to said memory;
   c. access control means for addressing said memory so as to operate said register memory sections as shift registers and to map shift register accesses of said at least one access port to predetermined addresses in a global address space of said memory, said control means being external to said memory and being configured to generate memory addresses for writing to and reading from said memory, and
   d. a buffer memory coupled to said at least one access port and to said memory, wherein a line width of said buffer memory and said memory is selected to be greater or equal the data width of said at least one access port multiplied by the sum of read accesses and write accesses per cycle, wherein said address ranges comprise overlapping regions of a predetermined size.

2. A device according to claim 1, wherein said access control means comprises at least one address counter.

3. A device according to claim 1, wherein said at least one access port provides access to a plurality of data sources for writing data to respective ones of said register memory sections, and to a plurality of data processing devices for reading data from said register memory sections.

4. A device according to claim 3, wherein said access control means is arranged to provide alternate access for said data sources and said data processing devices.

5. A device according to claim 3, wherein data source accesses are controlled to cycle through said global address space, and processing device accesses are controlled to cycle through the address range of a respective register memory section.

6. A device according to claim 1, wherein said memory is a single-port memory.

7. A device according to claim 1, wherein said buffer memory is arranged to buffer read and write accesses of said at least one access port.

8. A memory device comprising:
   a. a memory having at least two predetermined register memory sections addressable by respective address ranges;
   b. at least one access port for providing access to said memory;
   c. access control means for addressing said memory so as to operate said register memory sections as shift registers and to map shift register accesses of said at least one access port to predetermined addresses in a global address space of said memory, said control means being external to said memory and being configured to generate memory addresses for writing to and reading from said memory, and
   d. a buffer memory coupled to said at least one access port and to said memory, wherein a line width of said buffer memory and said memory is selected to be greater or equal the data width of said at least one access port multiplied by the sum of read accesses and write accesses per cycle, wherein said at least one access port comprises a plurality of write ports and a plurality of read ports, wherein the number of write ports differs from the number of read ports.

9. A memory device comprising:
   a. a memory having at least two predetermined register memory sections addressable by respective address ranges;
   b. at least one access port for providing access to said memory;
   c. access control means for addressing said memory so as to operate said register memory sections as shift registers and to map shift register accesses of said at least one access port to predetermined addresses in a global address space of said memory, said control means being external to said memory and being configured to generate memory addresses for writing to and reading from said memory, and
   d. a buffer memory coupled to said at least one access port and to said memory, wherein a line width of said buffer memory and said memory is selected to be greater or equal the data width of said at least one access port multiplied by the sum of read accesses and write accesses per cycle, wherein said address control means comprises address translation means for aligning addresses relating to said read accesses in such a way that they fit to said line width.

10. A device according to claim 9, wherein said address translation means comprises a look-up table.

11. A memory device comprising:
    a. a memory having at least two predetermined register memory sections addressable by respective address ranges;
    b. at least one access port for providing access to said memory;
    c. access control means for addressing said memory so as to operate said register memory sections as shift registers and to map shift register accesses of said at least one access port to predetermined addresses in a global address space of said memory, said control means being external to said memory and being configured to generate memory addresses for writing to and reading from said memory, and
    d. a buffer memory coupled to said at least one access port and to said memory, wherein a line width of said buffer memory and said memory is selected to be greater or equal the data width of said at least one access port multiplied by the sum of read accesses and write accesses per cycle, wherein said access control means is adapted to transfer write accesses to said buffer memory until it is full, and to write one memory line when said buffer memory is full.

12. A memory device comprising:
    a. a memory having at least two predetermined register memory sections addressable by respective address ranges;

b. at least one access port for providing access to said memory;

c. access control means for addressing said memory so as to operate said register memory sections as shift registers and to map shift register accesses of said at least one access port to predetermined addresses in a global address space of said memory, said control means being external to said memory and being configured to generate memory addresses for writing to and reading from said memory, and d. a buffer memory coupled to said at least one access port and to said memory, wherein a line width of said buffer memory and said memory is selected to be greater or equal the data width of said at least one access port multiplied by the sum of read accesses and write accesses per cycle, wherein said address control means is adapted to align read accesses in such a way that a block of said line width is read all the time.

13. A memory device comprising:

a. a memory having at least two predetermined register memory sections addressable by respective address ranges;

b. at least one access port for providing access to said memory;

c. access control means for addressing said memory so as to operate said register memory sections as shift registers and to map shift register accesses of said at least one access port to predetermined addresses in a global address space of said memory, said control means being external to said memory and being configured to generate memory addresses for writing to and reading from said memory, and d. a buffer memory coupled to said at least one access port and to said memory, wherein a line width of said buffer memory and said memory is selected to be greater or equal the data width of said at least one access port multiplied by the sum of read accesses and write accesses per cycle, wherein said at least two predetermined register memory sections are operated as FIFO memory sections.

14. A demultiplexing device for demultiplexing a plurality of input data streams and supplying demultiplexed data streams to a plurality of data processing units, said input data streams being supplied to a memory device, said memory device comprising:

a memory having at least two predetermined register memory sections addressable by respective address ranges;

at least one access port for providing access to said memory; and access control means for addressing said memory so as to operate said register memory sections as shift registers and to map shift register accesses of said at least one access port to predetermined addresses in a global address space of said memory, wherein said demultiplexing device comprises a PRML-based interleaver functionality.

15. A demultiplexing device according to claim 14, wherein said access control means comprises at least one address counter.

16. A demultiplexing device according to claim 14, wherein said at least one access port provides access to a plurality of data sources for writing data to respective ones of said register memory sections, and to a plurality of data processing devices for reading data from said register memory sections.

17. A demultiplexing device according to claim 16, wherein said access control means is arranged to provide alternate access for said data sources and said data processing devices.

18. A multiplexing device for multiplexing data streams supplied from a plurality of data processing units, and for generating multiplexed output data streams, said data streams being supplied to a memory device, said memory device comprising:

a memory having at least two predetermined register memory sections addressable by respective address ranges;

at least one access port for providing access to said memory; and access control means for addressing said memory so as to operate said register memory sections as shift registers and to map shift register accesses of said at least one access port to predetermined addresses in a global address space of said memory, wherein said multiplexing device comprises a PRML-based de-interleaver functionality.

19. A multiplexing device according to claim 18, wherein said at least one access port provides access to a plurality of data sources for writing data to respective ones of said register memory sections, and to a plurality of data processing devices for reading data from said register memory sections.

20. A multiplexing device according to claim 19, wherein said access control means is arranged to provide alternate access for said data sources and said data processing devices.

* * * * *